(12) United States Patent
Kordik et al.

(10) Patent No.: US 11,396,285 B2
(45) Date of Patent: Jul. 26, 2022

(54) SYSTEMS AND METHODS FOR MEASURING BRAKE WEAR

(71) Applicant: GOODRICH CORPORATION, Charlotte, NC (US)

(72) Inventors: Michael Kordik, Dayton, OH (US); Clifton Randolph Boggs, Springfield, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 174 days.

(21) Appl. No.: 16/924,912

(22) Filed: Jul. 9, 2020

(65) Prior Publication Data
US 2022/0009466 A1 Jan. 13, 2022

(51) Int. Cl.
| | | |
|---|---|---|
| *B60T 11/00* | (2006.01) | |
| *B60T 17/22* | (2006.01) | |
| *B60T 1/06* | (2006.01) | |
| *F16D 55/40* | (2006.01) | |
| *F16D 65/18* | (2006.01) | |
| *F16D 66/02* | (2006.01) | |
| *G01D 5/22* | (2006.01) | |
| *B64F 5/60* | (2017.01) | |
| *F16D 66/00* | (2006.01) | |
| *F16D 121/04* | (2012.01) | |

(52) U.S. Cl.
CPC ............ *B60T 17/221* (2013.01); *B60T 1/065* (2013.01); *F16D 55/40* (2013.01); *F16D 65/186* (2013.01); *F16D 66/021* (2013.01); *G01D 5/2291* (2013.01); *B64F 5/60* (2017.01); *F16D 2066/006* (2013.01); *F16D 2121/04* (2013.01)

(58) Field of Classification Search
CPC ........ F16D 55/36; F16D 55/40; F16D 65/186; F16D 66/021; F16D 66/025; F16D 65/72; F16D 65/74; F16D 2125/10; B60T 1/065; B60T 17/221; B60T 17/225; G01D 5/2291
See application file for complete search history.

(56) References Cited

U.S. PATENT DOCUMENTS

| | | | |
|---|---|---|---|
| 3,828,894 A | 8/1974 | Crossman | |
| 6,360,853 B1 * | 3/2002 | Maxwell | F16D 55/40 192/109 R |
| 9,969,378 B2 * | 5/2018 | Howell | B60T 8/1703 |
| 10,584,756 B2 | 3/2020 | Wilkes et al. | |

(Continued)

FOREIGN PATENT DOCUMENTS

DE 4212279 A1 * 10/1993 .............. B60T 17/22

OTHER PUBLICATIONS

Machine translation of DE 4212279 (no date).*
European Patent Office, European Search Report dated Oct. 22, 2021 in Application No. 21182321.6.

*Primary Examiner* — Nicholas J Lane
(74) *Attorney, Agent, or Firm* — Snell & Wilmer L.L.P.

(57) ABSTRACT

A system for determining brake wear based on hydraulic fluid volume may comprise a brake actuator and a fluid supply line fluidly coupled to the brake actuator. The brake actuator may include a brake ram configured to translate in response to changes in fluid pressure in the brake actuator. A piston may be fluidly coupled between a first portion of the fluid supply line and a second portion of the fluid supply line. The piston may include a cylinder and a ram configured to translate within the cylinder. A first sensor may be operably coupled to the piston.

18 Claims, 6 Drawing Sheets

(56) References Cited

U.S. PATENT DOCUMENTS

| | | |
|---|---|---|
| 2004/0226183 A1* | 11/2004 | Sielemann ............. G01D 3/021 |
| | | 33/708 |
| 2010/0276233 A1 | 11/2010 | Cahill |
| 2010/0286881 A1 | 11/2010 | Cahill |
| 2018/0297565 A1 | 10/2018 | Georgin |
| 2019/0263510 A1* | 8/2019 | Bill ........................ B60T 8/171 |
| 2019/0264765 A1 | 8/2019 | Juzswik |
| 2020/0010181 A1 | 1/2020 | Lindahl |
| 2020/0010195 A1 | 1/2020 | Herzig et al. |

* cited by examiner

SYSTEMS AND METHODS FOR MEASURING BRAKE WEAR

FIELD

The present disclosure relates generally to the field of brake systems, and more specifically to systems and methods for measuring brake wear using hydraulic sensors.

BACKGROUND

Aircraft typically utilize brake systems on wheels to slow or stop the aircraft during landings, taxiing, and rejected takeoffs. Aircraft brake systems generally employ a brake stack (also referred to as a heat sink) comprising a series of friction disks that may be forced into contact with one another by hydraulic actuators during braking to slow or stop the aircraft. Over time, braking operations cause the material to wear from the friction disks, thereby decreasing the axial thickness of the brake stack and increasing the distance (or stroke) the hydraulic actuator must translate to force the friction disks together. It is desirable to measure the wear of the brake stack to determine if maintenance and/or replacement is needed. Manually measuring the wear of the brake stack presents challenges with regard to the accuracy of the measurements and accessibility.

SUMMARY

Disclosed herein is a system for determining brake wear based on fluid volume. In accordance with various embodiments, the system may comprise a brake actuator and a fluid supply line fluidly coupled to the brake actuator. The brake actuator may include a brake ram configured to translate in response to changes in fluid pressure in the brake actuator. A piston may be fluidly coupled between a first portion of the fluid supply line and a second portion of the fluid supply line. The piston may include a cylinder and a ram configured to translate within the cylinder. A first sensor may be operably coupled to the piston.

In various embodiments, the first sensor may be configured to output a detection signal in response to the ram being located within a field of view of the first sensor. In various embodiments, the first sensor may be coupled to the cylinder.

In various embodiments, a second sensor may be coupled to the cylinder. The second sensor may be located closer to the second portion of the fluid supply line as compared to the first sensor. In various embodiments, a display may be electrically coupled to the first sensor and the second sensor. In various embodiments, the first sensor may be coupled to the ram. The first sensor may comprise a linear variable differential transformer.

In various embodiments, the ram may be configured to contact a floor of the cylinder and block a flow of fluid to the second portion of the fluid supply line in response to a loss of fluid from the second portion of the fluid supply line.

A multi-disk brake assembly is also disclosed herein. In accordance with various embodiments, the multi-disk brake assembly may comprise a plurality of friction disks and a brake actuator configured to translate relative to the plurality of friction disks. A fluid supply line may be fluidly coupled to the brake actuator. A piston may be fluidly coupled between a first portion of the fluid supply line and a second portion of the fluid supply line. The piston may include a cylinder and a ram configured to translate within the cylinder. A first sensor may be operably coupled to the piston.

In various embodiments, a fluid reservoir may be fluidly coupled to the first portion of the fluid supply line. In various embodiments, a brake servo valve may be coupled between the piston and the fluid reservoir, and a shuttle valve may be coupled between the piston and the brake actuator.

In various embodiments, the first sensor may be configured to output a detection signal in response to the ram being located within a field of view of the first sensor. In various embodiments, the first sensor may be coupled to the cylinder.

In various embodiments, a second sensor may be coupled to the cylinder. The second sensor may be located closer to the second portion of the fluid supply line as compared to the first sensor.

In various embodiments, a display may be electrically coupled to the first sensor. In various embodiments, the first sensor may be coupled to the ram.

A method of making a system for determining brake wear based on fluid volume is also discloses herein. In accordance with various embodiments, the method may comprise fluidly coupling a fluid supply line to a brake actuator configured to translate relative to a brake stack, coupling a piston between a first portion of the fluid supply line and a second portion of the fluid supply line, and operably coupling a first sensor to the piston.

In various embodiments, the piston may include a cylinder and a ram configured to translate within the cylinder. The first sensor may be configured to detect a position of the ram.

In various embodiments, operably coupling the first sensor to the piston may comprise at least one of mounting the first sensor to a first location on the cylinder or mounting the first sensor to the ram.

In various embodiments, the method may further comprise mounting a second sensor to a second location on the cylinder. The first location may be selected such that the ram will be located in a field of view of the first sensor when the brake stack is in an unworn state. The second location may be closer to the second portion of the fluid supply line, as compared to the first location.

In various embodiments, the method may further comprise configuring the ram to cut-off a flow of fluid to the second portion of the fluid supply line in response to a loss of fluid from the second portion of the fluid supply line.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for measuring brake wear. In accordance with various embodiments, the systems may determine the wear state of the friction disks of a brake stack based on the fluid provided to a brake actuator configured to translate relative to the friction disks. In accordance with various embodiments, the systems include an piston located between the brake actuator and a fluid reservoir. The piston includes a ram configured to translate within a piston cylinder in response to changes in fluid volume within the piston cylinder. One or more sensors may be operably coupled to the piston and capable of determining a position of the ram within the cylinder. The signals output put the sensor(s) may employed to determine a position of the ram, which correlates to a wear state of the brake stack.

Figure 1:
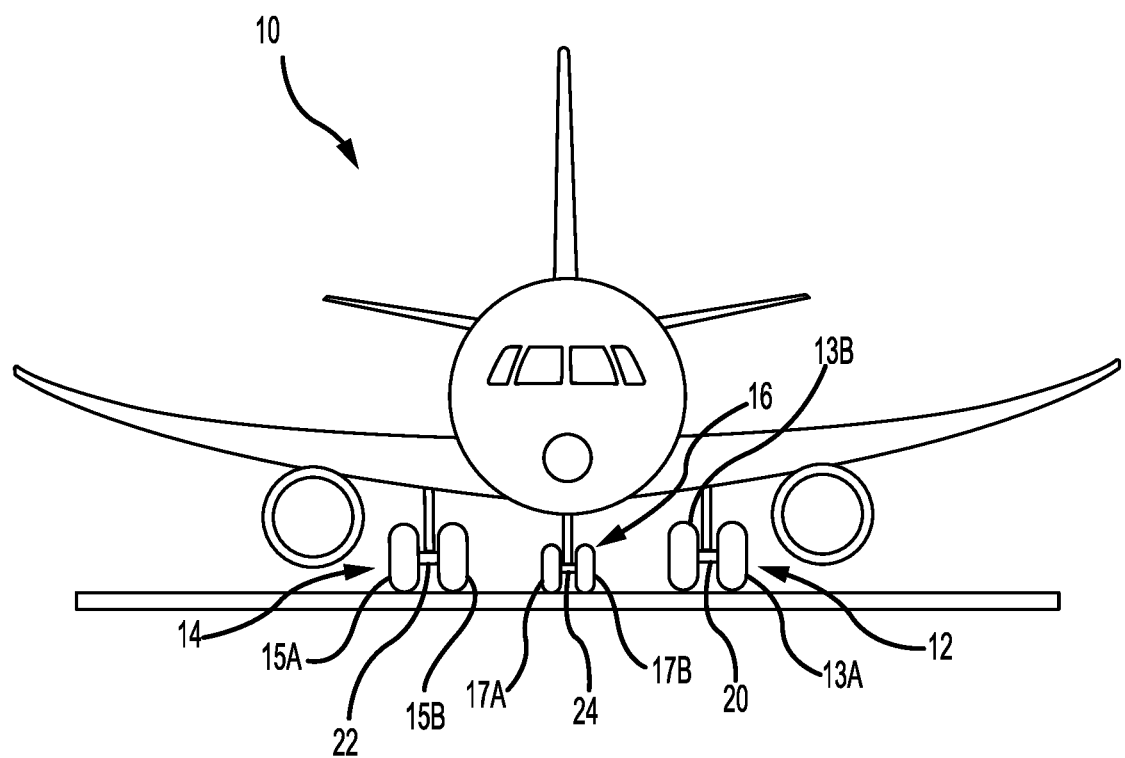
FIG. 1 illustrates an aircraft, in accordance with various embodiments.

With reference to FIG. 1, an aircraft 10 is illustrated, in accordance with various embodiments. Aircraft 10 may include landing gear such as left (or first) landing gear 12, right (or second) landing gear 14, and nose (or third) landing gear 16. Left landing gear 12, right landing gear 14, and nose landing gear 16 may generally support aircraft 10 when aircraft 10 is not flying, allowing aircraft 10 to taxi, take off, and land without damage. Left landing gear 12 may include left (or first) outboard (LOB) wheel 13A and left (or first) inboard (LIB) wheel 13B coupled by an axle 20. Right landing gear 14 may include right (or second) outboard (ROB) wheel 15A and right (or second) inboard (RIB) wheel 15B coupled by an axle 22. Nose landing gear 16 may include left nose wheel 17A and right nose wheel 17B coupled by an axle 24. The nose wheels may differ from the main wheels in that the nose wheels may not include a brake.

Figure 2:
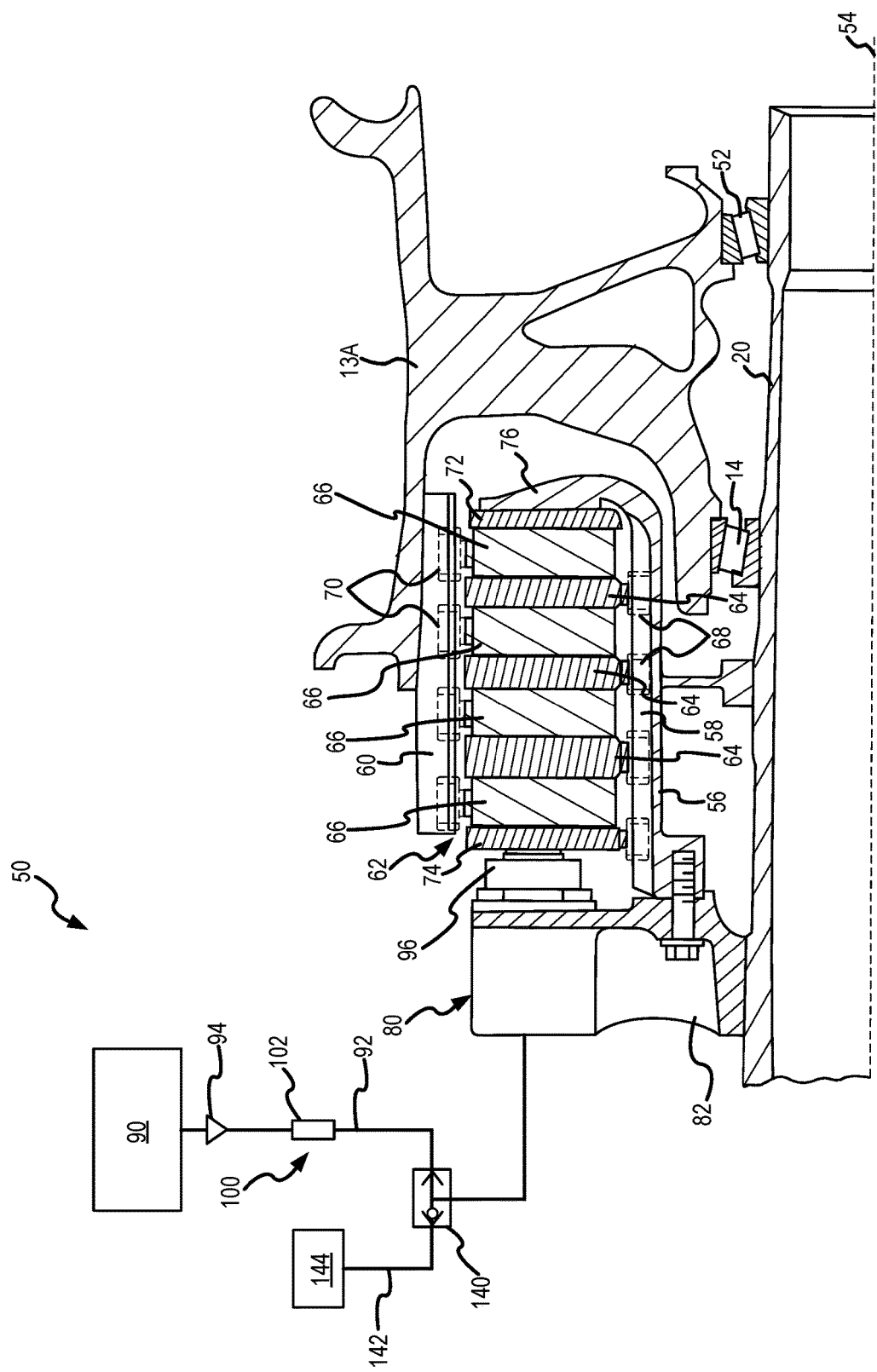
FIG. 2 illustrates a multi-disk brake assembly with a system for determining brake wear based on fluid volume, in accordance with various embodiments.

With reference to FIG. 2, a multi-disk brake assembly 50 of LOB wheel 13A is illustrated, in accordance with various embodiments. While FIG. 2 illustrates the brake assembly of LOB wheel 13A, it is contemplated and understood that each of LIB wheel 13B, ROB wheel 15A, and RIB wheel 15B includes a multi-disk brake assembly having the features and functionalities as described herein with respect to multi-disk brake assembly 50 of LOB wheel 13A. Multi-disk brake assembly 50 is mounted on axle 20 for use with LOB wheel 13A, which is disposed on and configured to rotate about the axle 20 via one or more bearing assemblies 52. A central axis 54 extends through the axle 20 and defines a center of rotation of the LOB wheel 13A. A torque tube 56 (sometimes referred to as a torque plate barrel or a torque plate) is aligned concentrically with the central axis 54. LOB wheel 13A is rotatable relative to the torque tube 56. Torque tube 56 includes a series of axially extending stator splines 58 (one shown). LOB wheel 13A includes a series of axially extending rotor splines 60 (one shown). Rotation of LOB wheel 13A is modulated by multi-disk brake assembly 50.

Multi-disk brake assembly 50 includes a brake stack 62. The brake stack 62 includes a plurality of friction disks with at least one non-rotatable friction disk (stator disk) 64, and at least one rotatable friction disk (rotor disk) 66. Each of the friction disks includes an attachment structure. In various embodiments, the stator disks 64 each includes a plurality of stator lugs 68 at circumferentially spaced positions around an inner circumference of the stator disk 64 as an attachment structure. Similarly, each of the rotatable rotor disks 66 includes a plurality of rotor lugs 70 at circumferentially spaced positions around an outer circumference of the rotor disk 66.

Brake stack 62 may include an end plate 72 and a pressure plate 74 located on opposing axial ends of the brake disk stack. End plate 72 is connected to, or is otherwise frictionally engaged with, a reaction plate 76 of torque tube 56. End plate 72 is non-rotatable by virtue of its connection to torque tube 56. Stator splines 58 may support pressure plate 74 such that pressure plate 74 is also non-rotatable. Stator splines 58 also support non-rotatable stator disks 64. Stator disks 64 engage stator splines 58 with gaps formed between stator lugs 68. Similarly, rotor disks 66 engage rotor splines 60 with gaps formed between rotor lugs 70. Rotor disks 66 are rotatable by virtue of their engagement with rotor splines 60 of LOB wheel 13A.

Multi-disk brake assembly 50 further includes one or more brake actuators 80 (one shown) circumferentially spaced around an actuator housing 82. Rotor disks 66 are arranged with end plate 72 on an end of the brake stack 62 opposite to brake actuators 80, with pressure plate 74 on an end of the brake stack 62 adjacent to brake actuator 80, and with stator disks 64 interleaved with rotor disks 66 such that each rotor disk 66 is adjacent to non-rotatable friction components. Brake actuators 80 are connected to actuator housing 82 at circumferentially spaced positions around actuator housing 82. Brake actuators 80 face axially toward and contact a side of pressure plate 74 that is opposite rotor disks 66. Upon actuation, the brake actuators 80 affect a braking action by urging pressure plate 74, stator disks 64, and end plate 72 into frictional engagement with rotor disks 66. The rotor disks 66 and the stator disks 64 may thus be pressed together between pressure plate 74 and end plate 72 to slow, stop, or otherwise prevent rotation of the LOB wheel 13A.

Brake actuators 80 may be hydraulically or pneumatically powered. In this regard, brake actuators 80 are fluidly connected to a fluid reservoir 90 (shown schematically). In accordance with various embodiments, a fluid supply line 92 fluidly couples brake actuators 80 and fluid reservoir 90. A brake servo valve (BSV) 94 may be coupled between brake actuators 80 and fluid reservoir 90. During braking, the BSV 94, based on braking commands from the pilot (often via an electronic controller that may implement anti-skid or other brake logic), controls the amount of fluid provided and the pressure applied to the brake actuator 80, and thus, the braking force applied to LOB wheel 13A. The changes in pressure cause a brake ram 96 of brake actuator 80 to translate toward and away from brake stack 62. In accordance with various embodiments, brake actuators 80 are configured to automatically adjust, as the friction disks wear, so that brake ram 96 is located the same, or approximately the same, distance from stator and rotor disks 64, 66 when the braking force is not being applied. Stated differently, "a running clearance" of multi-disk brake assembly 50 (i.e., a distance between brake ram 96 and stator and rotor disks 64, 66) does not increase as the axial thickness of brake stack 62 decreases. As the friction disks wear, the axial length of the brake stack 62 decreases, thereby causing brake ram 96 to extend further axially to compress the brake stack. In this regard, as the friction disks wear, the axial thickness of brake stack 62 decreases, which causes less fluid to return to fluid reservoir 90 (i.e., more fluid is located within brake actuators 80), during non-braking.

Multi-disk brake assembly 50 further includes a system 100 for determining a wear state (e.g., unworn, 50% worn, 90% worn, fully worn, etc.) of brake stack 62. System 100 may be operationally coupled to fluid supply line 92. As used herein, a fully, or 100%, worn brake stack refers to a brake stack having an axial thickness that prevents brake actuators 80 from exerting braking force. Stated another way, brake actuator 80 has a limited amount of stroke (i.e., there is a maximum distance brake ram 96 can travel in the axial direction toward reaction plate 76). If the axial thickness of brake stack 62 is too small (i.e., if the brake stack 62 is in a fully worn state), the stroke limit of brake actuator 80 prevents brake ram 96 from forcing rotor disks 66 and the stator disks 64 together, thereby causing multi-disk brake assembly 50 to stop generating torque. As used herein, a "50% worn" brake stack means that an axial length of the usable friction material of the brake stack has decreased by 50% from the axial length of the usable friction material in a new, or "unworn", brake stack. Similarly, a "90% worn" brake stack means that the axial length of the usable friction material has decreased by 90%. For example, a brake stack that had an axial length of 20 inches (50.8 cm) with 15 inches (38.1 cm), measured axially, of usable friction material when new (i.e., when in a 0% or "unworn" state) would have an axial length of 12.5 inches (31.75 cm) with 7.5 inches (19.05 cm) of usable material in the 50% worn state, an axial length of 6.5 inches (16.51 cm) with 1.5 inches (3.81 cm) of usable material in the 90% worn state, and an axial length of 5 inches (12.7 cm) with 0 inches of usable material in the 100%, or "fully," worn state.

As described in further detail below, system 100 includes a piston 102. Piston 102 is located between BSV 94 and brake actuator 80. In various embodiments, a shuttle valve 140 may be coupled between fluid supply line 92 and an emergency fluid supply line 142. Shuttle valve 140 may be configured to allow fluid from an emergency reserve 144 to flow to brake actuator 80 in response to the fluid pressure in fluid supply line 92 dropping below a predetermined threshold pressure. In various embodiments, piston 102 may be located between shuttle valve 140 and BSV 94. In various embodiments, piston 102 may be located between shuttle valve 140 and brake actuator 80.

Figure 3:
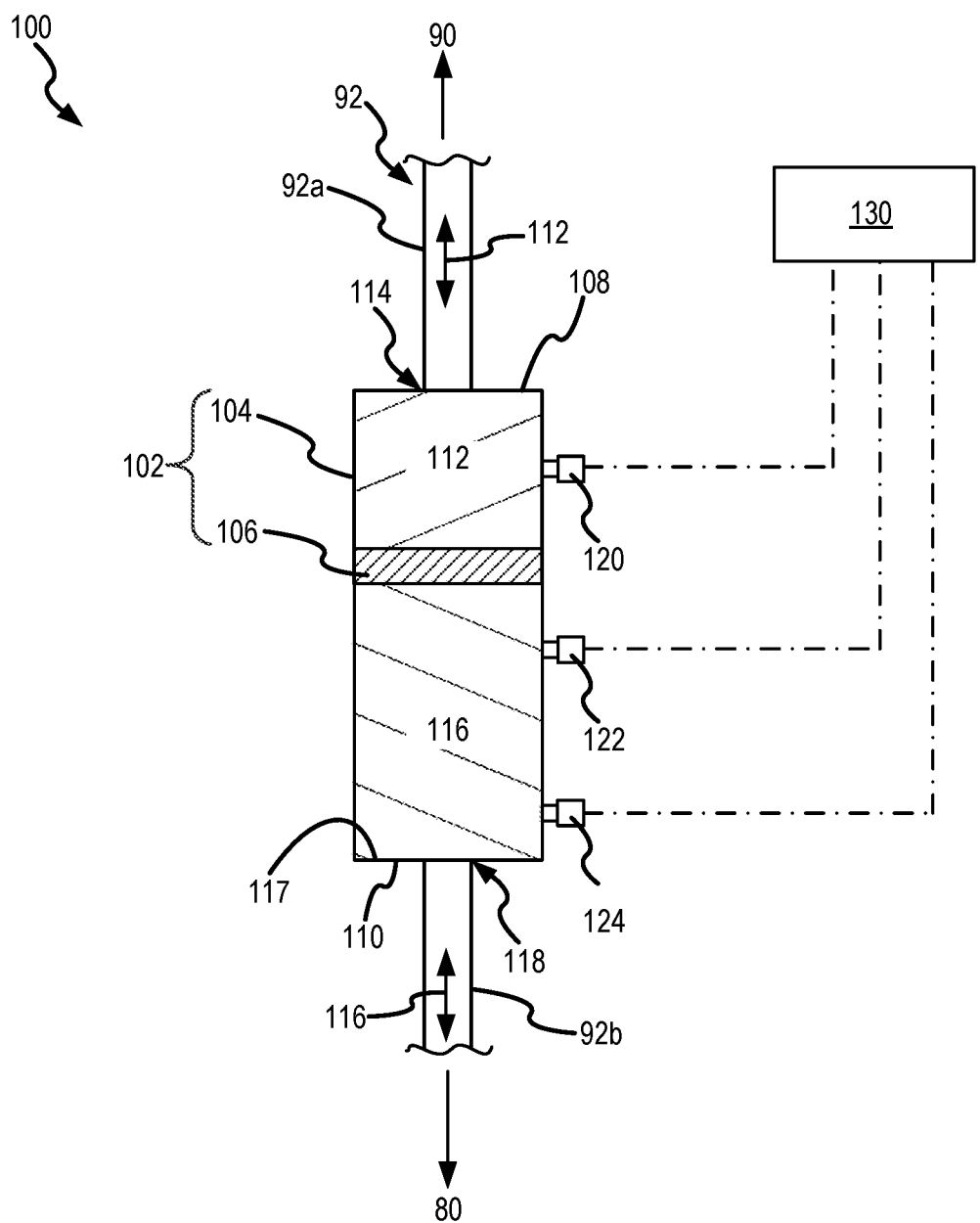
FIG. 3 illustrates a system for determining brake wear based on fluid volume, in accordance with various embodiments.

With additional reference to FIG. 3, additional details of system 100 are illustrated. In accordance with various embodiments, piston 102 is fluidly coupled in line with fluid supply line 92. Piston 102 include a cylinder 104 and a ram 106 configured to translate within cylinder 104. A first portion 92a of fluid supply line 92 fluidly couples cylinder 104 of piston 102 to fluid reservoir 90. In various embodiments, first portion 92a may be coupled to a first end 108 of cylinder 104. A second portion 92b of fluid supply line 92 fluidly couples cylinder 104 of piston 102 to brake actuator 80. In various embodiments, second portion 92b may be coupled to a second end 110 of cylinder 104.

During braking (e.g., in response to a braking command from the pilot), fluid 112 from fluid reservoir 90 flows into cylinder 104 via a first orifice 114 in cylinder 104, thereby increasing the volume of fluid 112 in cylinder 104. The increase of fluid 112 increases the pressure on ram 106, thereby causing ram 106 to translate toward second end 110 of cylinder 104. The translation of ram 106 towards second end 110 forces a fluid 116 located between ram 106 and second end 110 to flow out a second orifice 118 in cylinder 104 and into brake actuator 80. The increase in fluid 116 from piston 102 forces brake ram 96 (FIG. 2) to translate toward brake stack 62, thereby generating braking force. In response to cessation of the braking command, fluid 116 flows from brake actuator 80 into cylinder 104, ram 106 translates toward first end 108 of cylinder 104, and fluid 112 flows from cylinder 104 into fluid reservoir 90. As the friction disks wear, less fluid 116 is returned to cylinder 104. In this regard, as the axial thickness of brake stack 62 decreases, ram 106 will be located closer to second end 110 during non-braking conditions.

Figure 4C:
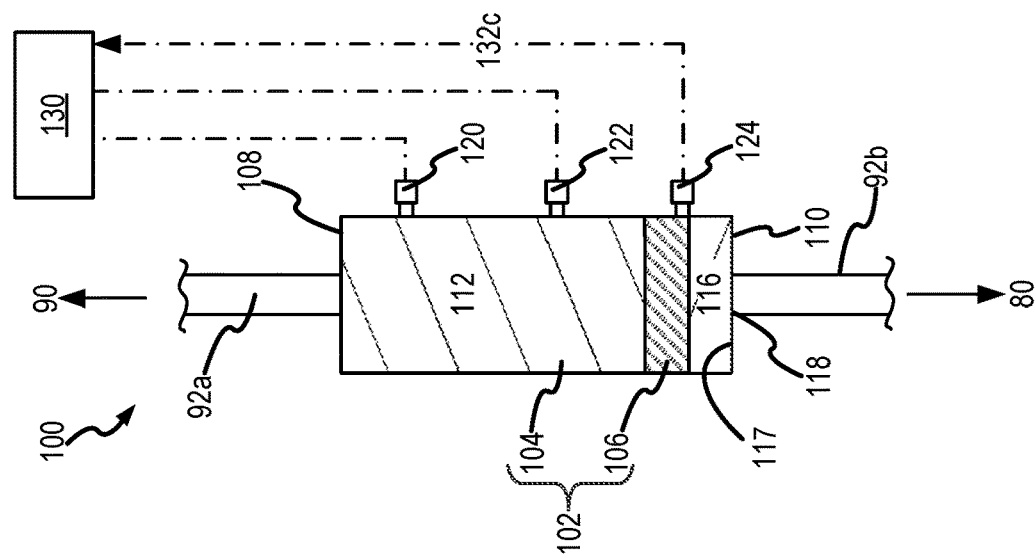
FIGS. 4A, 4B, and 4C illustrate the system of FIG. 3 during a non-braking condition and with the brake stack in various states of wear, in accordance with various embodiments.
Figure 4B:
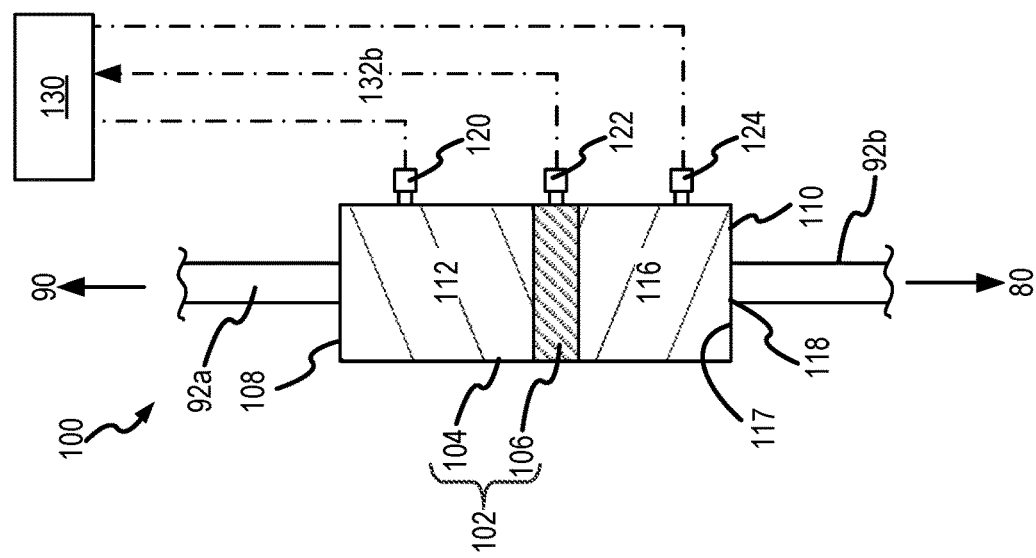
Figure 4A:
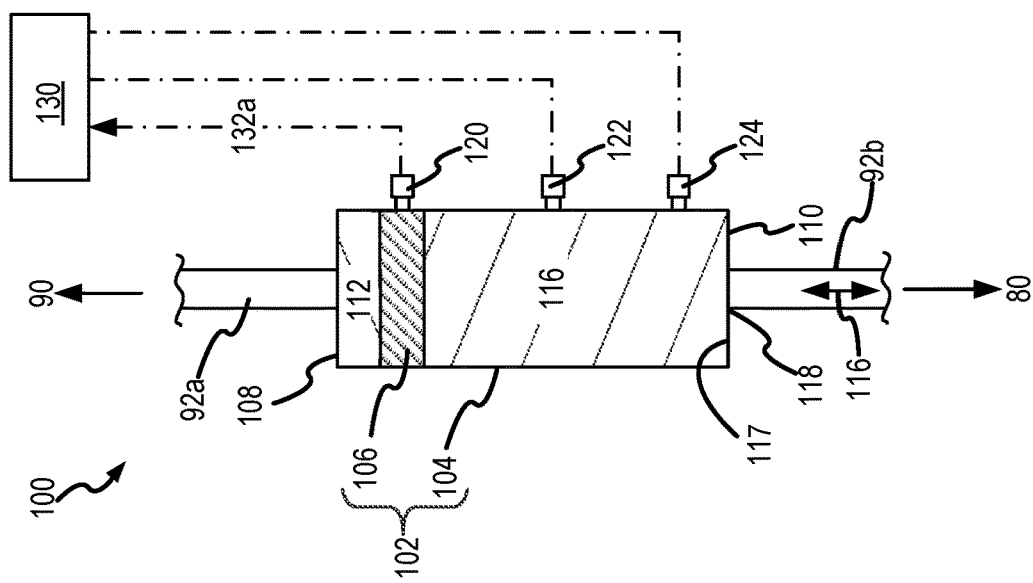

For example, FIG. 4A shows piston with the brake stack 62 (FIG. 2) in an unworn state during a non-braking condition. FIG. 4B shows piston 102 with brake stack 62 in 50% worn state during a non-braking condition. FIG. 4C shows piston 102 with brake stack 62 in 90% worn state during a non-braking condition. In the unworn state (FIG. 4A), ram 106 is located closer to first end 108 of cylinder 104, during non-braking conditions, as compared to the position of ram 106 in the 50% worn state (FIG. 4B) during non-braking conditions. Similarly, the 50% unworn state (FIG. 4B), ram 106 is located closer to first end 108 of cylinder 104, during non-braking conditions, as compared to the position of ram 106 in the 90% worn state (FIG. 4C) during non-braking conditions.

With continued reference to FIG. 3, in accordance with various embodiments, system 100 includes one or more sensors, such as sensor 120, sensor 122, and sensor 124, operationally coupled to piston 102. Sensors 120, 122, 124 are configured to detect the presence of ram 106 within the sensor's field of view. In various embodiments, sensors 120, 122, 124 are attached to cylinder 104. Sensors 120, 122, 124 may comprise capacitive sensors, optical sensors, electromechanical sensors, pneumatic sensors, magnetic sensors, inductive sensors, or any other sensor capable of detecting the presence of ram 106. Sensors 120, 122, 124 may be configured to output a detection signal in response to detecting ram 106. Sensors 120, 122, 124 may output the detection signals to a display 130. Sensors 120, 122, 124 are electrically coupled to and are in operable communication with display 130. Sensors 120, 122, 124 may be coupled to display 130 via wired or wireless connection.

Display 130 may be configured to communicate information relating to brake stack 62 to the aircraft operator, maintenance crew, pilot, co-pilot, etc. For example, display 130 may indicate a wear state of brake stack 62 and/or that maintenance or replacement of the brake stack 62 is needed. Display 130 may include lights, a screen, a speaker, a network access device that sends a message to a remote terminal, and/or the like.

In FIG. 4A, ram 106 is in the field of view of sensor 120, and sensor 120 outputs detection signal 132*a* to display 130. In response to detection signal 132*a*, display 130 outputs a message (e.g., a illuminates a light, modifies a message on a screen, etc.) that indicated brake stack is in an unworn state. Positioning sensor 120 to correspond to an unworn brake stack may also allow for detection braking system anomalies. For example, ram 106 not being in the field of view of sensor 120, when multi-disk brake assembly 50 includes a new, unworn brake stack 62, indicates a fluid leak may be present in fluid supply line 92.

In FIG. 4B, ram 106 is in the field of view of sensor 122, and sensor 122 outputs detection signal 132*b* to display 130. In response to detection signal 132*b*, display 130 outputs a message (e.g., a illuminates a light, modifies a message on a screen, etc.) that indicates brake stack is in a 50% worn state. In FIG. 4C, ram 106 is in the field of view of sensor 124, and sensor 124 outputs detection signal 132*c* to display 130. In response to detection signal 132*c*, display 130 outputs a message (e.g., a illuminates a light, modifies a message on a screen, etc.) that indicates brake stack is in a 90% worn state. While system 100 is illustrated as having three (3) sensors, with sensor locations corresponding to the unworn state, the 50% worn state, and the 90% worn state, it is contemplated and understood that system 100 may include any number of sensors at any desired location along.

Indicating a current wear state of the brake stack 62 allows the aircraft operator to better determine when maintenance and/or replacement of the brake stack will be needed. In various embodiments, system 100 may send signals corresponding to the wear state of the brake stack to friction disks suppliers. Sending signals directly to suppliers may allow the supplier to better determine the amount of friction disks will need to be manufactured in the coming months.

Piston 102 may also serve as a cut-off valve to brake actuator 80. For example, if the pressure generated by fluid 116 drops significantly due to, for example, a burst or a leak in second portion 92*b* of fluid supply line 92, ram 106 translates to second end 110 of cylinder 104. Ram 106 may contact a floor 117 of cylinder 104 and/or block second orifice 118. Stated differently, ram 106 may be configured to block the flow of fluid 112 to second portion 92*b* of fluid supply line 92 and thus to brake actuator 80, in response to a fluid leak downstream of piston 102 (i.e., in response to a loss of fluid from second portion 92*b* of fluid supply line 92 and/or in response to the pressure within second portion 92*b* dropping below a threshold pressure). Ram 106 is thus configured to prevent fluid 112 from flowing to the burst fluid supply line. Employing piston 102 as a fluid cut-off may allow for the removal of one or more brake systems fuses, which are also configured to cut-off the supply of fluid in the event of a burst line.

As used herein, "downstream" refers to the flow direction from piston 102 to brake actuator 80 and from fluid reservoir 90 to piston 102, and is opposite of the "upstream" direction, which, as used herein, refers to the flow direction from brake actuator 80 to piston 102 and from piston 102 to fluid reservoir 90.

Figure 5:
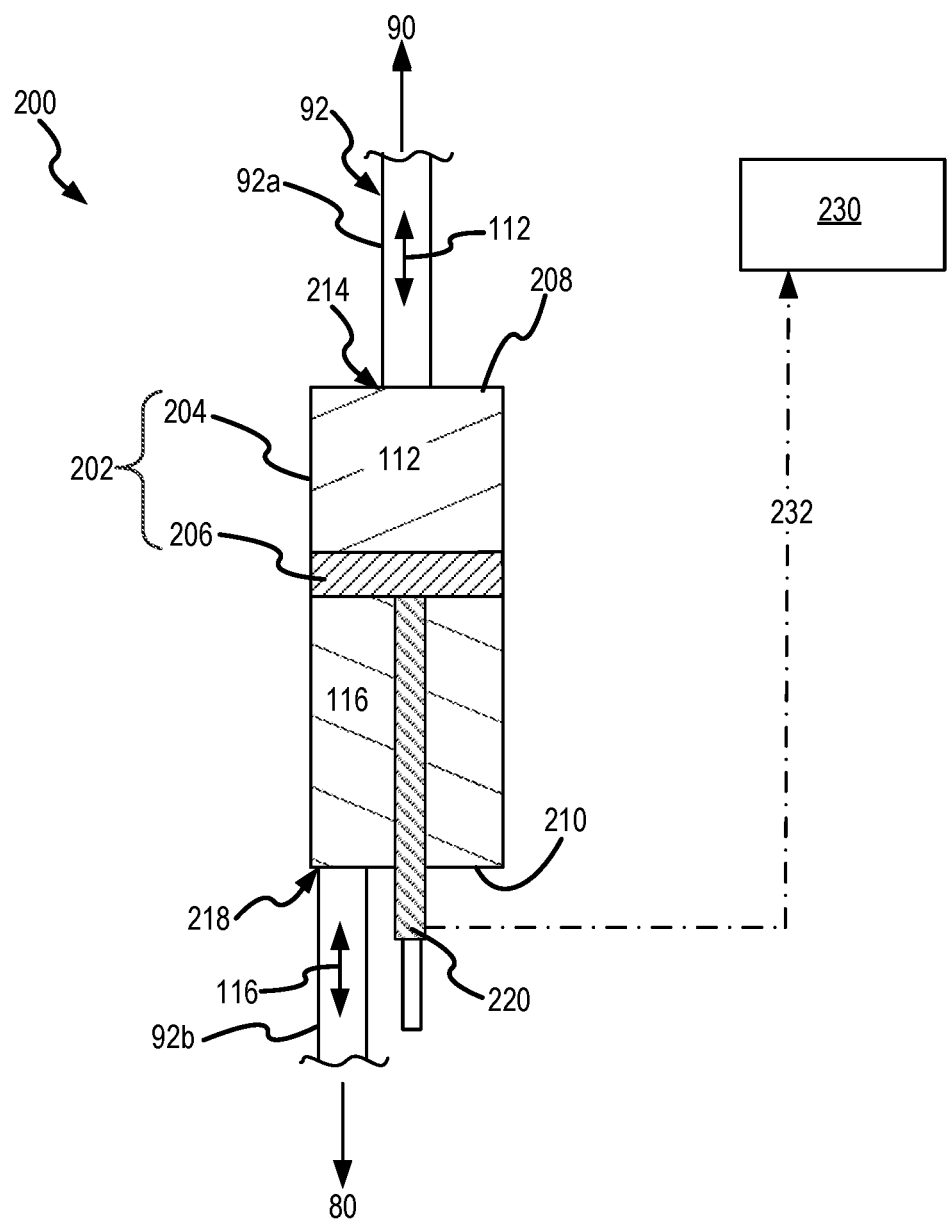
FIG. 5 illustrates a system for determining brake wear based on fluid volume, in accordance with various embodiments.

With reference to FIG. 5, a system 200 for determining a wear state of a brake stack is illustrated. In various embodiments, multi-disk brake assembly 50, in FIG. 2, may include system 200 in place of system 100. System 200 includes a piston 202. Piston 202 is fluidly coupled in line with fluid supply line 92. Piston 202 include a cylinder 204 and a ram 206 configured to translate within cylinder 204. First portion 92*a* of fluid supply line 92 fluidly couples cylinder 204 of piston 202 to fluid reservoir 90. In various embodiments, first portion 92*a* may be coupled to a first end 208 of cylinder 204. A second portion 92*b* of fluid supply line 92 fluidly couples cylinder 204 of piston 202 to brake actuator 80. In various embodiments, second portion 92*b* may be coupled to a second end 210 of cylinder 204.

During braking (e.g., in response to a braking command from the pilot), fluid 112 from fluid reservoir 90 flows into cylinder 204 via a first orifice 214 in cylinder 204, thereby increasing the volume of fluid 112 in cylinder 204. The increased volume of fluid 112 increases the pressure on ram 206, thereby causing ram 206 to translate toward second end 210 of cylinder 204. The translation of ram 206 towards second end 210 forces a fluid 116 located between ram 206 and second end 210 to flow out a second orifice 218 in cylinder 204 and into brake actuator 80. The fluid 116 from piston 202 forces brake ram 96 (FIG. 2) to translate toward brake stack 62, thereby generating braking force. In response to cessation of the braking command, fluid 116 flows from brake actuator 80 into cylinder 204, ram 206 translates toward first end 208 of cylinder 204, and fluid 112 flows from cylinder 204 into fluid reservoir 90. As the friction disks of brake stack 62 wear, less fluid 116 is returned to cylinder 204. In this regard, as the axial thickness of brake stack 62 decreases, ram 206 will be located closer to second end 210 during non-braking conditions.

In accordance with various embodiments, system 200 includes a position sensor 220. Position sensor 220 is coupled to ram 206. Position sensor is configured to determine a position of ram 206. In various embodiments, sensor 220 may comprise a linear variable differential transformer (LVDT). Sensor 220 may be electrically coupled to a display 230. Sensor 220 may output signals 232 corresponding to the position of ram 206 to display 230. Sensor 220 may be coupled to display 230 via a wired or a wireless connection.

Display 230 may be configured to communicate information relating to brake stack 62 to an operator, maintenance crew, pilot, co-pilot, etc. For example, display 230 may indicate a wear state of brake stack 62 and/or that maintenance or replacement of the brake stack 62 is needed based on signals 232 from sensor 220. Display 230 may include lights, a screen, a speaker, a network access device that sends a message to a remote terminal, and/or the like. Sensor 220 may also allow other brake systems anomalies to be detected. For example, the axial thickness of the brake stack 62 not coinciding with the location of ram 206, indicates a fluid leak or brake system fault condition may be present. Further, sensor 220 may allow for detection of the rate or speed at which ram 206 is translating within cylinder 204. The position of ram 206 changing at a greater rate than would be associated with the rate of normal brake stack may indicate the presence of a fault condition in fluid supply line 92 and/or in multi-disk brake assembly 50.

Indicating a current wear state of the brake stack 62 allows an aircraft operator to better determine when maintenance and/or replacement of the brake stack will be needed. In various embodiments, system 200 may send signals corresponding to a wear state of the brake stack to friction disks suppliers. Sending signals directly to suppliers may allow the supplier to better determine the amount of friction disks that will need to be manufactured in the coming months.

Piston 202 may also serve as a cut-off valve to brake actuator 80. For example, if the pressure generated by fluid 116 drops significantly, due to, for example, a burst in second portion 92b of fluid supply line 92, ram 206 translates to second end 210 of cylinder 204 and blocks second orifice 218, thereby preventing the flow of fluid 112 to brake actuator 80. In this regard, ram 206 prevents fluid 112 from flowing to the burst fluid line. Employing piston 202 as a fluid cut-off may allow for the removal of one or more brake systems fuses, which are also configured to cut-off the supply of fluid in the event of a burst line.

Figure 6:
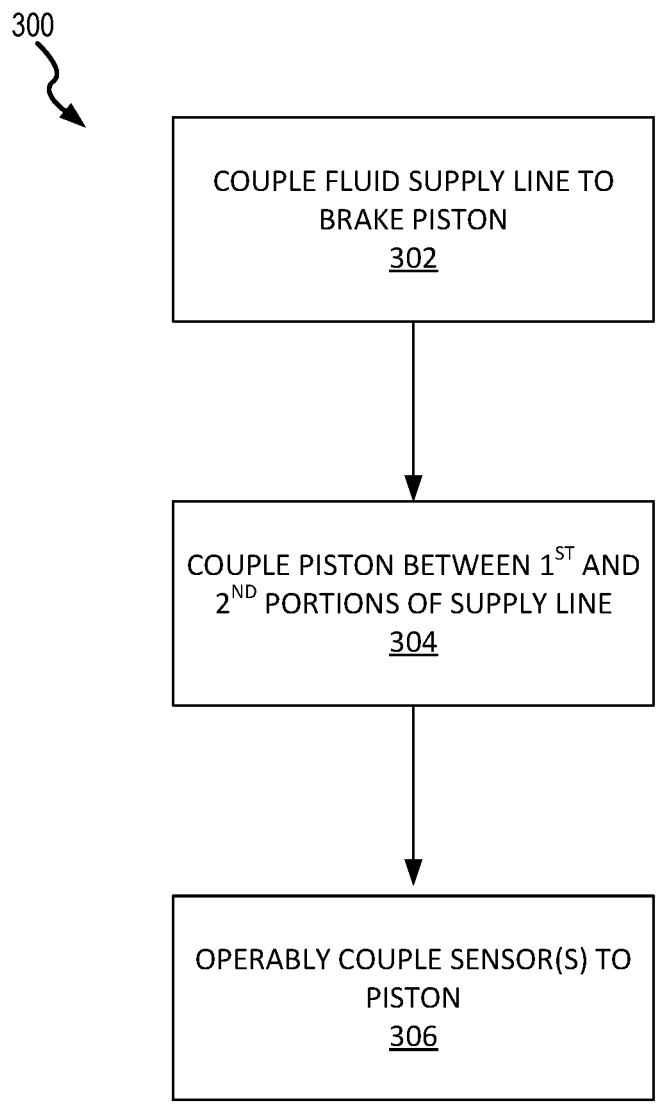
FIG. 6 illustrates a method of making a system for determining brake wear based on fluid volume, in accordance with various embodiments.

With reference to FIG. 6, a method 300 of making a system for determining brake wear based on fluid volume is illustrated. Method 300 may comprise fluidly coupling a fluid supply line to a brake actuator (step 302). The brake actuator may include a brake ram configured to translate relative to a brake stack of a multi-disk brake assembly. Method 300 further includes coupling a piston between a first portion of the fluid supply line and a second portion of the fluid supply line (step 304) and operably coupling a first sensor to the piston (step 306). The piston includes a cylinder and a ram configured to translate within the cylinder. The first sensor is configured to detect a position of the ram.

In various embodiments, step 306 may include mounting the first sensor to a first location on the cylinder. In various embodiments, step 306 may include mounting the first sensor to the ram. In various embodiments, method 300 may further comprise mounting a second sensor to a second location on the cylinder. In various embodiments, the first location may be selected such that the ram will be located in the field of view of the first sensor when the brake stack is in an unworn state. In various embodiments, the second location is closer to the second portion of the fluid supply line, as compared to the first location. In various embodiments, method 300 may further comprise configuring the ram to cut-off a flow of fluid to the second portion of the fluid supply line in response to a loss of fluid in the second portion of the fluid supply line.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for determining brake wear based on fluid volume, comprising:
    a brake actuator including a brake ram configured to translate in response to changes in fluid pressure in the brake actuator;
    a fluid supply line fluidly coupled to the brake actuator;
    a piston fluidly coupled between a first portion of the fluid supply line and a second portion of the fluid supply line, the piston including a cylinder and a ram configured to translate within the cylinder;
    a first sensor operably coupled to the piston;
    a brake servo valve upstream of the piston; and
    a shuttle valve coupled between the piston and the brake actuator.

2. The system of claim 1, wherein the first sensor is configured to output a detection signal in response to the ram being located within a field of view of the first sensor.

3. The system of claim 2, wherein the first sensor is coupled to the cylinder.

4. The system of claim 3, further comprising a second sensor coupled to the cylinder, the second sensor being located closer to the second portion of the fluid supply line as compared to the first sensor.

5. The system of claim 4, further comprising a display electrically coupled to the first sensor and the second sensor.

6. The system of claim 1, wherein the first sensor is coupled to the ram, and wherein the first sensor comprises a linear variable differential transformer.

7. The system of claim 1, wherein the ram is configured to contact a floor of the cylinder and block a flow of fluid to the second portion of the fluid supply line in response to a loss of fluid from the second portion of the fluid supply line.

8. A multi-disk brake assembly, comprising:
    a plurality of friction disks;

a brake actuator configured to translate relative to the plurality of friction disks;

a fluid supply line fluidly coupled to the brake actuator;

a piston fluidly coupled between a first portion of the fluid supply line and a second portion of the fluid supply line, the piston including a cylinder and a ram configured to translate within the cylinder;

a first sensor operably coupled to the piston;

a fluid reservoir fluidly coupled to the first portion of the fluid supply line;

a brake servo valve coupled between the piston and the fluid reservoir; and a shuttle valve coupled between the piston and the brake actuator.

9. The multi-disk brake assembly of claim 8, wherein the first sensor is configured to output a detection signal in response to the ram being located within a field of view of the first sensor.

10. The multi-disk brake assembly of claim 9, wherein the first sensor is coupled to the cylinder.

11. The multi-disk brake assembly of claim 10, further comprising a second sensor coupled to the cylinder, the second sensor being located closer to the second portion of the fluid supply line as compared to the first sensor.

12. The multi-disk brake assembly of claim 8, further comprising a display electrically coupled to the first sensor.

13. The multi-disk brake assembly of claim 12, wherein the first sensor is coupled to the ram.

14. A method of making a system for determining brake wear based on fluid volume, the method comprising:

fluidly coupling a fluid supply line to a brake actuator configured to translate relative to a brake stack;

coupling a piston between a first portion of the fluid supply line and a second portion of the fluid supply line;

coupling the first portion of the fluid supply line to a brake servo valve;

coupling a shuttle valve between the second portion of the fluid supply line and the brake actuator; and operably coupling a first sensor to the piston.

15. The method of claim 14, wherein the piston includes a cylinder and a ram configured to translate within the cylinder, and wherein the first sensor is configured to detect a position of the ram.

16. The method of claim 15, wherein operably coupling the first sensor to the piston comprises at least one of mounting the first sensor to a first location on the cylinder or mounting the first sensor to the ram.

17. The method of claim 16, further comprising mounting a second sensor to a second location on the cylinder, wherein the first location is selected such that the ram will be located in a field of view of the first sensor when the brake stack is in an unworn state, and wherein the second location is closer to the second portion of the fluid supply line, as compared to the first location.

18. The method of claim 15, further comprising configuring the ram to cut-off a flow of fluid to the second portion of the fluid supply line in response to a loss of fluid in the second portion of the fluid supply line.

* * * * *